(12) United States Patent
Hurley

(10) Patent No.: US 7,776,294 B2
(45) Date of Patent: Aug. 17, 2010

(54) AIR POLLUTION REDUCTION SOLUTION

(75) Inventor: Peter J. Hurley, West Yorkshire (GB)

(73) Assignee: Cylenchar Limited, Fixby, Huddersfield (GB)

( * ) Notice: Subject to any disclaimer, the term of this patent is extended or adjusted under 35 U.S.C. 154(b) by 0 days.

(21) Appl. No.: 12/362,049

(22) Filed: Jan. 29, 2009

(65) Prior Publication Data
US 2009/0202407 A1 Aug. 13, 2009

Related U.S. Application Data

(60) Provisional application No. 61/028,242, filed on Feb. 13, 2008, provisional application No. 61/031,730, filed on Feb. 27, 2008.

(51) Int. Cl.
B01D 53/34 (2006.01)
B01D 53/64 (2006.01)
C09K 3/00 (2006.01)

(52) U.S. Cl. ............. 423/210; 252/182.11; 252/183.11; 252/183.12; 252/183.14

(58) Field of Classification Search ................ 423/210; 252/182.11, 183.11, 183.12, 183.14
See application file for complete search history.

(56) References Cited

U.S. PATENT DOCUMENTS

| 2,300,965 | A | * | 11/1942 | Merle Randall | ............... 299/12 |
| 4,474,896 | A |   | 10/1984 | Chao | ........................... 502/216 |
| 5,034,203 | A | * | 7/1991 | Audeh et al. | ................. 423/210 |
| 5,877,393 | A |   | 3/1999 | Webster | ..................... 588/236 |
| 6,214,304 | B1 |   | 4/2001 | Rosenthal et al. | ........... 423/210 |
| 6,719,828 | B1 |   | 4/2004 | Lovell et al. | ................... 95/134 |
| 7,081,434 | B2 |   | 7/2006 | Sinha | .......................... 502/400 |
| 7,407,602 | B2 |   | 8/2008 | Hurley | ................... 252/182.11 |
| 2005/0244319 | A1 |   | 11/2005 | Hurley | ........................ 423/212 |
| 2006/0094920 | A1 |   | 5/2006 | Roper | ......................... 588/256 |
| 2007/0092418 | A1 |   | 4/2007 | Mauldin et al. | .............. 423/210 |

FOREIGN PATENT DOCUMENTS

WO WO 2008/008475 A2 1/2008

OTHER PUBLICATIONS

Licata et al., "Multi-Pollutant Emissions Control & Strategies: CoalFired Power Plant Mercury Control by Injecting Sodium Tetrasulfide" Babcock Power Environmental Inc.-Technical Publication, ICAC Forum, T-185: pp. 1-10 (2003).
International Preliminary Report on Patentability, Application No. PCT/EP2009/051412, mailed May 26, 2010.

* cited by examiner

Primary Examiner—Timothy C Vanoy
(74) Attorney, Agent, or Firm—Winston & Strawn LLP

(57) ABSTRACT

An improved method of controlling air pollution, a combustion gas is passed through a solution of an alkaline-earth metal sulfide and a redox buffer (e.g., a mono alkaline-earth metal phosphate salt), preferably but not essentially in combination with an alkaline-earth metal carbonate FGD system. The reagents are provided in a fully soluble form enabling low cost application and retrofitting of existing facilities whilst also including alkaline-earth bases salts, which advantageously afford stability to the process product. The reagents co-precipitate when the solution achieves a pH of 4.5 to 6.5 such as is encountered in the acidic environment in conduits that carry combustion flue gases.

19 Claims, 3 Drawing Sheets

Typical Power Plant Configuration

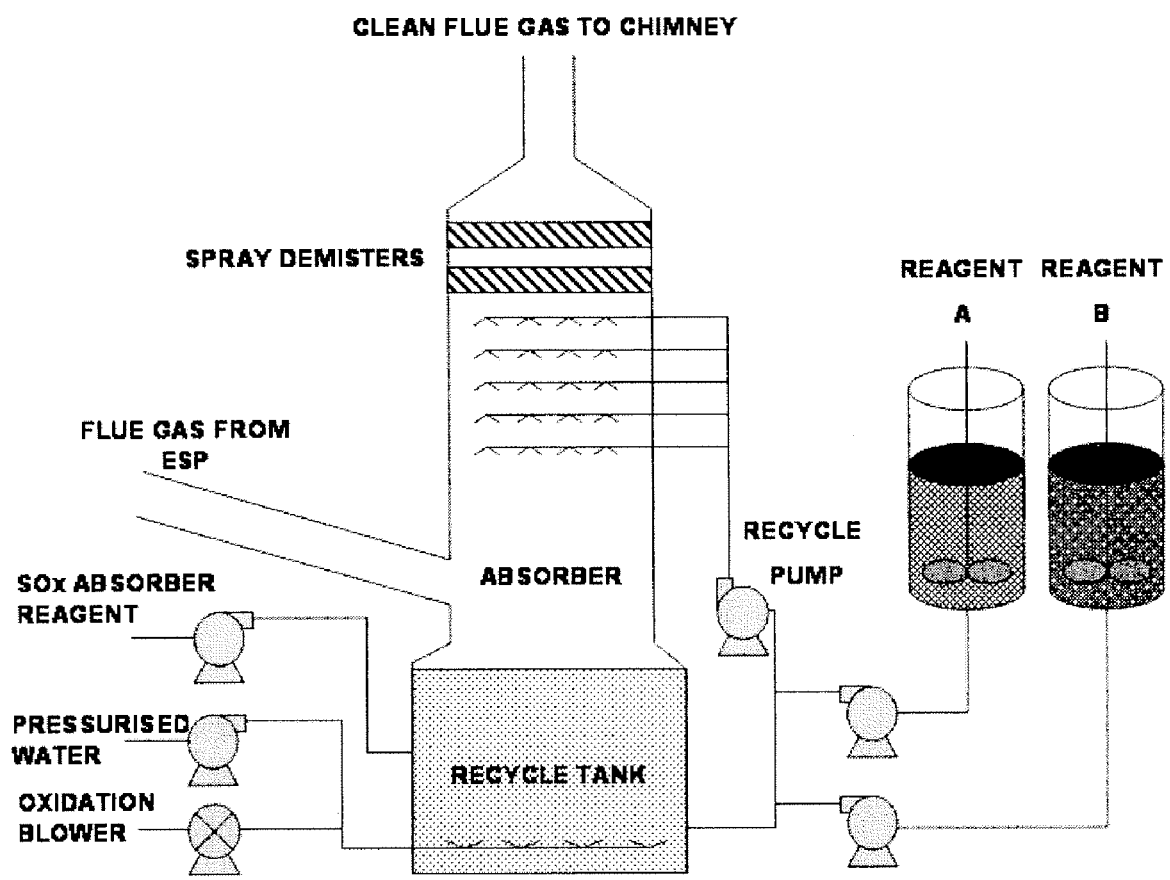

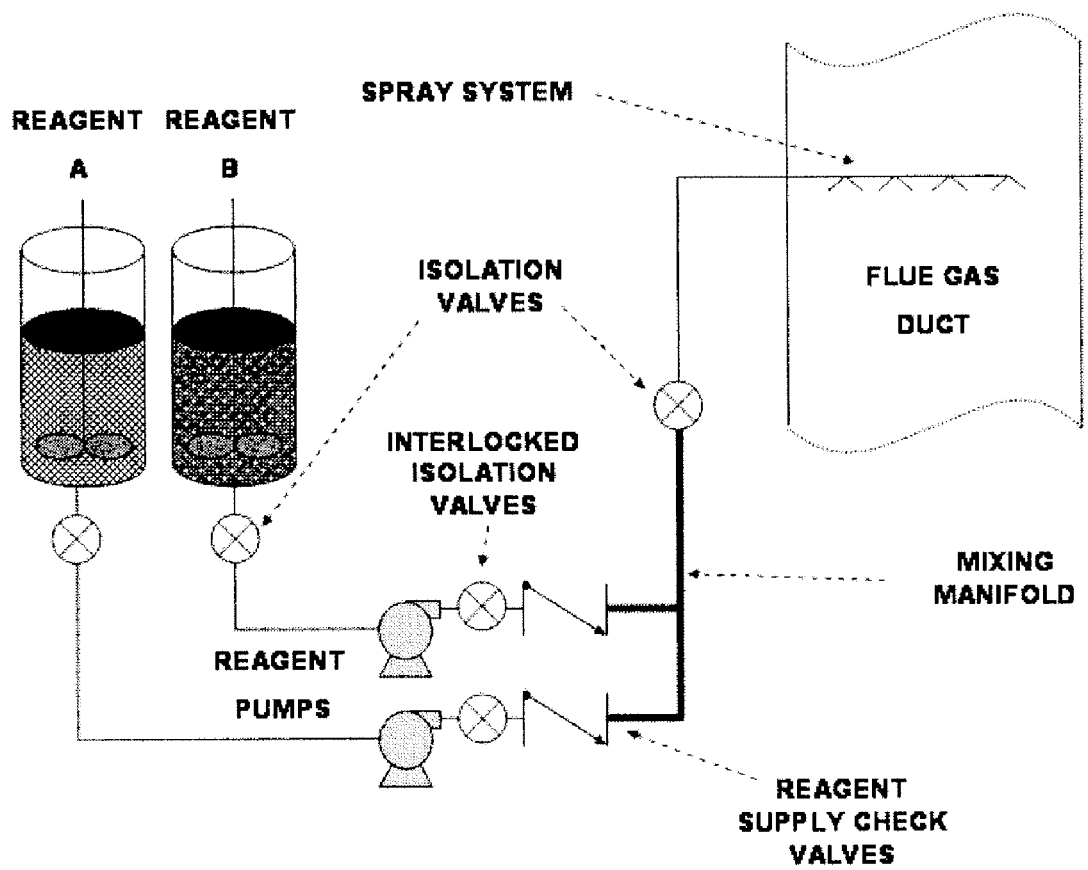
FIGURE 3 - Dry Scrubber Detail

AIR POLLUTION REDUCTION SOLUTION

CROSS REFERENCE TO RELATED APPLICATIONS

This application claims the benefit of U.S. provisional application Ser. Nos. 61/028,242, filed Feb. 13, 2008 and 61/031,730 filed Feb. 27, 2008, each of which is incorporated herein by reference.

BACKGROUND

The present invention relates to a composition for controlling the amount of air pollution emitted from combustion gasses, and in particular to alkaline earth metal polysulfides for removing mercury from flue gasses. The invention also relates to the use of the compositions to reduce air pollution by removing mercury and other pollutants from combustion exhaust gasses, and the methods employed to accomplish such reduction of air pollution.

Combustion gasses from incinerators, power plants, and coal-fired furnaces typically contain oxides of sulfur ($SO_x$), oxides of nitrogen ($NO_x$), and volatile heavy metals such as mercury. On combustion, the mercury is volatilized and carried in the combustion exhaust gasses into the atmosphere.

Coal-burning electric power plants are the single biggest source of mercury emissions, accounting for 40 percent of the total mercury emitted from all man-made sources. Coal-fired burners account for another 10 percent. Coal fired power stations burning high sulfur bituminous and sub-bituminous coal combustion gases typically discharge combustion gases containing 10-20 $\mu g/Nm^3$ total mercury and 1 to 3 $\mu g/Nm^3$ elemental mercury ($Hg^0$) from their electrostatic precipitation (ESP) systems. On entering a wet FGD system the ionized and oxidized portion of the total mercury ($Hg^X$) becomes largely dissolved in the scrubber $SO_x$ absorption media with approximately 5% of the inbound $Hg^X$ passing through the system. Wet FGD absorption media are typically 25-30% w/w solids dispersions of calcium carbonate, magnesium carbonate, or a mixture thereof and their respective sulphites and sulphates.

Mercury poses a serious problem for human beings and the environment and as such protection from exposure to mercury pollution has been the subject of US legislation resulting in The Clean Air Mercury Rule of Mar. 15, 2005 and the EPA's Clean Air Interstate Rule (CAIR). Mercury, atomic symbol Hg, is a persistent, bioaccumulative toxic metal that is emitted in combustion gasses in three forms: Elemental mercury, $Hg^0$, oxidized mercury, $Hg^{2+}$ compounds, and particle-bound mercury. After mercury has precipitated from the air and deposited into bodies of water or onto the land, methylmercury is formed by microbial action in the top layers of sediment and soils. Once formed, methylmercury is taken up by aquatic organisms and bioaccumulates up the aquatic food web. Methylmercury is a well-established human neurotoxicant. Methylmercury that is ingested by humans is readily absorbed from the gastrointestinal tract and can cause effects in several organ systems.

The aim of these regulations is to significantly reduce emissions from coal-fired power plants, the largest remaining sources of mercury emissions in the US. When fully implemented, these rules will reduce utility emissions of mercury from 48 tons a year to 15 tons, a reduction of nearly 70 percent. Typical mercury concentrations in coal are 0.05 to 0.25 mg/Kg. The typical discharge concentrations of total mercury, largely in its elemental form are in the range 2 to 6 $\mu g/Nm^3$, (where $Nm^3$ is Non-IUPAC nomenclature. N or "normal" refers to gas volumes converted to 0° C. and a pressure of 1.013 bar).

Prior efforts to control mercury emissions, in addition to other processes, have employed the addition of sulfide reagents to flue gas desulphurization (FGD) scrubbers. These sulfides have been alkali metal sulfides. The alkali metal are listed in group 1 of the periodic table and includes lithium, sodium, potassium, rubidium, cesium and francium. The alkali metal sulfide compounds previously employed for removing mercury were typically sodium sulfide, $Na_2S$, potassium sulfide, $K_2S$, and sodium tetrasulfide, $Na_2S_4$, as well as the alkali metal polysulfides, $MS_n$. See, e.g., U.S. Pat. No. 6,214,304, and Babcock Power Environmental Inc. Technical Publication, "Multi-Pollutant Emissions Control & Strategies, Coal-Fired Power Plant Mercury Control by Injecting Sodium Tetrasulfide"; Licata A, Beittel R, Ake T, ICAC Forum, Nashville, Tenn. Oct. 14-15, 2003 and US Patent Application 2006/0094920. However, alkali metal/alkaline-earth metal sulfide blends and alkaline-earth metal dispersions have also been used. Some approaches utilize adsorbents such as powdered activated carbon, silicates, zeolites, clays and ash as solid supports for binding mercury on the surfaces of the solid. For example, U.S. Pat. No. 4,474,896 discloses an absorbent for mercury that is a polysulfide-containing adsorbent composition of a zeolite that has been treated to contain a metal cation capable of forming insoluble polysulfides when exposed to sulfanes in either vapor form or in an organic solution. In these absorbents the mercury vapor is first trapped in pores of a heterogeneous support that may incorporate sulfur containing compounds for reaction with mercury. However, each of these methods involve the use of a solid phase support, such as ion exchange resins or zeolites, and do not involve homogeneous phase reactions between mercury and the reactants in solution. These adsorbents, however, rely upon the surface area of the support to provide improved dispersion of the sulfur compounds. The preferred support materials have ion-exchange characteristics, and employ transition metals as the cation for the insoluble polysulfide. The surfaces available to adsorb the mercury eventually becomes saturated, and must be disposed of or regenerated. The method employed with these adsorbents involve passing the gas or liquid in contact with the support to allow adsorption of the mercury. U.S. Pat. No. 6,719,828 discloses a similar adsorbent using a solid substrate to support a polyvalent metal sulfide, and using sulfides and transition metals to bind to the mercury on the adsorbent surfaces. The adsorbent is injected into the flue gas to undergo a heterogeneous interaction with e mercury vapor.

Another form of adsorbent is disclosed in U.S. Patent Application 2007/0092418, which utilizes micro-porous sorbent particulates obtained from metal sulfates and metal sulfites by a high temperature reduction process that forms metal sulfides. These are solid phase particulates that act as a heterogeneous support substrate for the interaction between the mercury in the flue gas and sulfides in the particulates, where the mercury diffuses from the bulk flue gas to the solid surface of the particulates to react with the sulfides. U.S. Pat. No. 7,081,434 discloses impregnating fly-ash with sorbent materials to remove mercury from flue gas through a heterogeneous interaction. Many of these approaches, however, have not been very successful.

Mercury ions, $Hg^{2+}$ react with sulfur, $S^{2-}$ to form sulfide compounds, HgS. This compound precipitates from solution as either metacinnabar, a black compound, or cinnabar, a red compound. Both forms are insoluble, however metacinnabar is unstable with respects to cinnabar, and will change into cinnabar slowly over time.

The precipitated mercury sulfide, in its black or beta-crystalline form, β-HgS, can be readily oxidized by pH or redox-induced reactions if is not stabilized, thereby rendering the mercury sulfide precipitate vulnerable to re-oxidation and resolubilization in water. This reoxidation of the reaction residues is greatly enhanced if the process contains alkali metal salts, such as sodium sulfate, sodium sulfite or sodium chloride. The presence of alkali metal ions renders the resultant black heavy metal sulfide more amorphous and less stable to re-oxidation and or resolubilization than a heavy metal sulfide prepared solely in the presence of alkaline-earth ions such as calcium or magnesium. This resolublization has the potential for increased bioavailability.

The dissolved mercury ions can react with trace amounts of elemental iron and iron II oxides carried with the dust of the combustion gases. The $Hg^{x+}$ present becomes reduced in part to metallic mercury, $Hg^0$, which being poorly soluble in water and highly volatile at moderately high temperatures is discharged as $Hg^0$ vapor with the outgoing flue gases. This process wherein the outbound $Hg^0$ concentration from the FGD scrubber exceeds its inbound concentration is termed 'mercury re-emission'.

To overcome the above process product stability issues, a process was devised to incorporate solely alkaline-earth based components. See U.S. Pat Application 2005/0244319 and PCT Int. Appl. Publication WO/2008/008475. This process has a major drawback. Due to the relative insolubility and consequential slow reactivity of the alkaline-earth based components used it is necessary to carry out costly preparation of the reagent by fine milling the reagent mixture to an average particle size of approximately 3 micron prior to addition to the scrubber system. This is done such that its surface area of its active components can react with the mercury entering the scrubber in the few seconds of gas residence time available. This reagent system has limited utility owing to the tendency of the alkali earth based reagents to recrystallize and agglomerate with the result that particle size can double within a few days leading loss of chemical efficacy and handling problems due to settling of the reagent in a dense cake beneath clear supernatant liquor. Furthermore, prolonged contact of the sulfide and phosphate components leads to a loss of sulfide content attributed to accelerated oxidation catalyzed by phosphate. This oxidation can be as much as 20% within 2 days of preparation for a 20% w/w aqueous slurry of a blend of calcium carbonate, calcium sulfide, trisuperphosphate (in the ratios 4:4:1 or 3:2:1) and settling can be as much as 60% within a few hours of its preparation. Additionally, technical calcium sulfide is extremely abrasive in nature leading to excessive wear of grinding media as well as significant wear and tear to the check values of pumps used to mobilize calcium sulfide containing slurries. To overcome the difficulty of handling such materials expensive grinding media and costly equipment are required, e.g., 316 grade stainless steel pumps fitted with durable but expensive ceramic check-valves.

On entering a wet FGD system the ionized and oxidized portion of the total mercury ($Hg^x$) becomes largely dissolved in the scrubber $SO_x$ absorption media with approximately 5% of the inbound $Hg^x$ passing through the system. Wet FGD absorption media is typically a dispersions of calcium carbonate, magnesium carbonate, or a mixture thereof and their respective sulphites and sulphates. It would be desirable to further decrease the amount of inbound $Hg^x$ that simply passes through the system. Furthermore, it would be desirable to provide more efficient chemicals and systems for removal of mercury from combustion gases in general. The present invention now satisfies these desired and needs.

SUMMARY OF THE INVENTION

The invention provides a composition for removing one or more metals from exhaust gasses comprising a first component of an aqueous solution of at least one water-soluble alkaline-earth polysulfide in an amount sufficient to react with such metal(s) and a second component of at least one redox buffering agent, the solution initially having a pH of 7 or more to avoid precipitation of the components.

Advantageously, the alkaline-earth polysulfide has a pH of greater than 10 and is present at a concentration of 20 to 35% w/w. The alkaline-earth polysulfide is preferably a magnesium polysulfide, a calcium polysulfide or a mixture of magnesium and calcium polysulfides with each polysulfide, or their mixture, being present in an amount of 25 to 29%.

Preferably, the redox buffering agent is a water-soluble monobasic alkaline earth metal salt of phosphoric acid, has a pH of 3 to 3.5 and is present in the aqueous solution at a concentration of 0.5 to 5% w/w. On entering the acidic environment of the scrubber the pH of composition falls to 4.5 to 6.5, with resultant co-precipitation of the components to form a finely dispersed form or emulsion of an agent that reacts with the metal(s) in the exhaust gas.

The alkaline-earth polysulfide and redox buffer solution can be mixed together and introduced into the scrubber system where the low pH of the exhaust gas causes the polysulfide and buffer to co-precipitate to form the reaction agent for removal of the metal(s). Alternatively, the polysulfide and buffer can be independently co-injected into the scrubber system, such that they are allowed to mix intimately therein, such that when a pH of 4.5 to 6.5 is reached they co-precipitate to form an emulsion or micro-dispersion of the reactive agent within the scrubber vessel. The reagent mixture so formed is not permitted time to flocculate and agglomerate before it encounters the scrubber liquor and becomes fully dispersed within the scrubber liquor. Alternatively, a soluble alkaline-earth polysulfide solution and a soluble redox buffer solution are rapidly mixed in an aqueous solution at a preferred pH of 7 to 9 such that the components are intimately mixed to form a co-solution that within 1 minute or less is injected into the scrubber vessel, such that on entering the scrubber and exposure to an acidic environment, the solution reaches a pH of 4.5 to 6.5 where the composition precipitates in-situ to form an active emulsion or micro-dispersion of calcium phosphate-polysulfide reagent. Critically the mixture will not be permitted time to flocculate and agglomerate before encountering the scrubber liquor and be fully dispersed. Critically, rapid mixing of the reagents within the scrubber permits sufficient intimate contact between the components to form a micro-dispersion or emulsion of reactive reagent. When followed by maximum possible dilution by immediate addition into the scrubber ensures preservation of the minimum possible particle size and the maximum possible surface area available for reaction with available mercury without the need for costly reagent grinding or the pumping of abrasive slurries.

The composition can further comprise a surfactant or hyperdispersant in an amount sufficient to facilitate dispersion of the precipitated reagent on entering the scrubber. The advantageous surfactants and hyperdispersants are polyethylene oxide-polyethylene block copolymers and the phosphate esters of these block copolymers.

The invention also relates to a method of removing metals from an exhaust gas which comprises contacting the exhaust gas with one of the compositions disclosed herein. This contact can be carried out a number of different ways. For example, the composition can be sprayed into a conduit that carries the exhaust gas so that droplets of the composition containing the reactive agent contact the metal(s) in the exhaust gas for reaction and removal therefrom. The composition can be made by providing a first solution of the at least one water-soluble alkaline-earth metal polysulfide; providing a second solution of the at least one redox buffering agent; and combining the solutions together prior to spraying to form the composition. The preferred compositions have a pH between 7 and 9 and the solutions are combined less than one minute before being sprayed into the exhaust gas conduit in order to avoid any precipitation or settlement of the components. On entering the conduit and interaction with the gases present, the reagent spray attains a practical mixing pH of 4.5 to 6.5 within the spray droplets.

Alternatively, the composition can be made by providing a first solution of the at least one water-soluble alkaline-earth metal polysulfide; providing a second solution of the at least one redox buffering agent; and separately spraying or injecting each solution into the conduit in a manner such that they intersect, combine, interact or coalesce in the conduit to form the composition in situ and such that the gas reduces the pH of the solution with the polysulfide and buffering agent co-precipitating at a pH of 4.5 to 6.5 to form the agent in droplets of the solution with the agent reacting with the metal(s) in the exhaust gas for removal therefrom.

Another embodiment of the invention is the use of one of the compositions disclosed herein for the treatment of an exhaust gas for removing one or more metals therefrom.

BRIEF DESCRIPTION OF THE DRAWINGS

The invention will become better understood when reference is made to the accompanying drawings, wherein:

FIG. 2 is a schematic illustration of a wet FGD scrubber system for removing mercury from a combustion gas according to one embodiment of the present invention; and FIG. 3 is a schematic illustration of a dry scrubber system for removing mercury from a combustion gas incorporating a rapid mixing manifold according to another embodiment of the present invention;

DETAILED DESCRIPTION OF THE INVENTION

Figure 1:
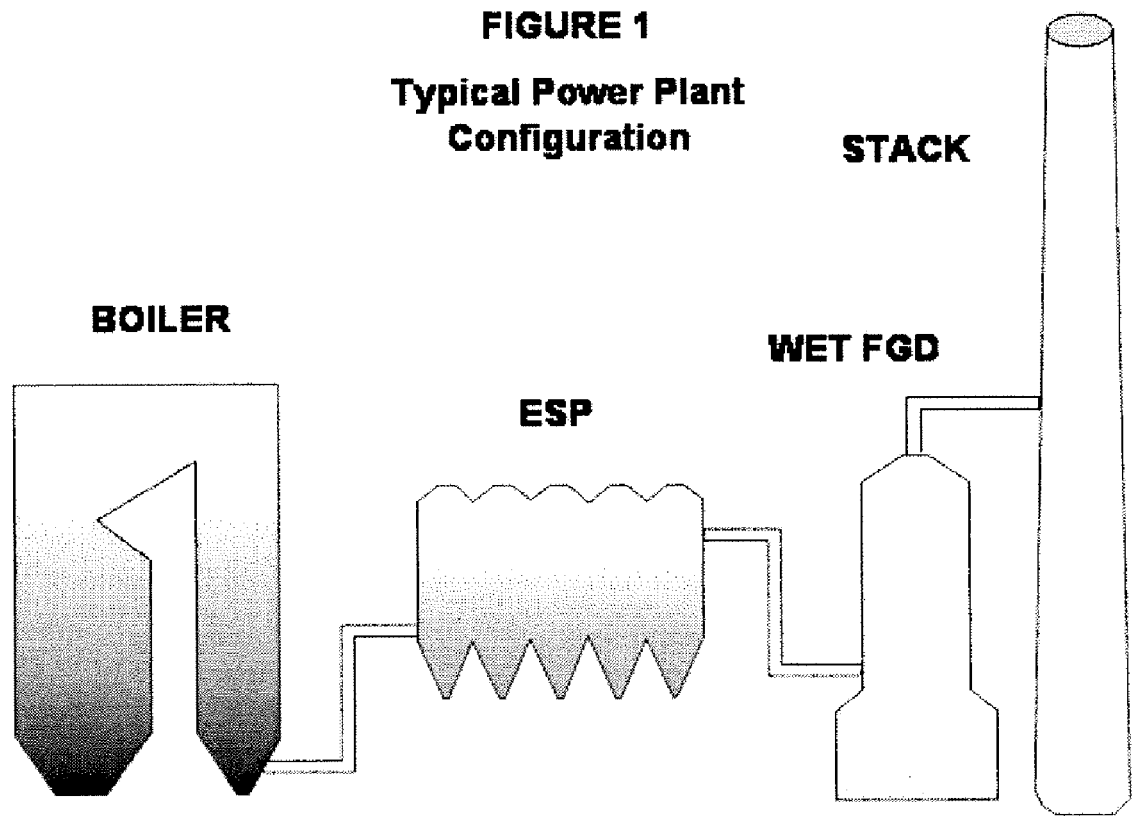
FIG. 1 is a schematic illustration of a typical coal fired power plant configuration.

It has been discovered that the use of an alkaline-earth metal polysulfide is a significant improvement over the other compounds and adsorbents that are used in the art. Essentially insoluble and solid in form, alkaline-earth metal sulfides and polysulfides are much less malodorous than alkali metal sulfides and polysulfide. Moreover, metal polysulfides are less volatile and malodorous than their corresponding sulfides. As the alkaline-earth polysulfides are the least malodorous of these materials, they are the easiest to handle by operating personnel. Also, due to the effect of steric hindrance of the polysulfide chain, these materials are less susceptible to the debilitating degradative oxidation that is experienced by alkali metal sulfides, alkaline-earth metal sulfides and alkali metal/alkaline-earth metal sulfide blends.

The process reagent components utilized within this invention, being fully soluble in water, are easy to process, ship, handle and pump with the minimal of fuss using readily available equipment which is obtainable at relatively low cost.

The invention relates to compositions that can be used to remove mercury and other pollutants from combustion gasses to reduce the amount of metal or other air pollution contaminants released into the atmosphere by the flue gases of incinerators, power plants and coal-fired furnaces. Specifically, the invention relates to the use of such compositions for reducing the amount of mercury and other pollutants in combustion flue or exhaust gasses, and the method employed to accomplish such reduction of air pollution. The composition comprises an alkaline-earth metal polysulfide, where the alkaline-earths are listed in group 2 of the periodic table and includes beryllium, magnesium, calcium, strontium, barium and radium. The preferred embodiments of this invention utilize magnesium and calcium.

The polysulfide comprises chains of sulfur atoms that can range from $S_2$ to $S_{30}$, and will react with the alkaline-earth metal cations to form the metal polysulfides. The preferred embodiment includes alkaline-earth metal polysulfides selected from magnesium polysulfide, $MgS_n$ and calcium polysulfide, $CaS_n$ and mixtures thereof.

These alkaline-earth metal polysulfides are self-solubilizing in an aqueous solution. The concentrations at which the alkaline-earth metal polysulfides demonstrate this self-solubilizing characteristics depends upon the pH of the solution, where the lower value of the acceptable pH range drops as the concentration of alkaline-earth metal polysulfide to be solubilized is reduced. The concentration and pH, therefore, are interrelated, and the two values are adjusted to permit the polysulfide to remain in solution. To be self-solubilizing in an aqueous solution, the calcium polysulfide, $CaS_n$ preferably has a concentration of 25 to 29% w/w, and a pH of greater than 8. A solution with a pH below 8 will cause the calcium polysulfide solution to lose its self-solubilizing properties and precipitate out as an emulsion of calcium polysulfide.

The composition can also include a redox buffering agent which preferably includes mono-, di-, or tri-basic alkaline-earth phosphoric acid salts. A more preferred redox buffering agent is calcium dihydrogen phosphate, $Ca(H_2PO_4)_2$. The aqueous solution of calcium dihydrogen phosphate preferably has a concentration of 2% w/w, and a pH of 3 to 3.5, however the solution may have a concentration less than 2% w/w.

The composition may also include a surfactant or polymeric hyperdispersant to facilitate the reagent dispersion and improve the transfer of elemental mercury to the liquid phase. The preferred surfactants and hyperdispersants are polyethylene oxide-polyethylene block copolymers and the phosphate esters of these block copolymers. These polyethylene oxide-polyethylene block copolymers and the phosphate esters are preferred because they mimic the behavior of lipids and thereby permit the non-ion metallic mercury to contact the reactive agent is solution droplets for reaction and removal. The commercially available hyperdispersants of these types include Brij 500® or Sulplus D540® (of Noveon Specialty Additives, Noveon Division, Lubrizol Ltd., Manchester, United Kingdom). The preferred addition concentrations of hyperdispersant are approximately 1 part per 1000 of Solplus D540® in the redox buffering agent solution, but the concentration may be between approximately 1 part per million and 9 parts per thousand. The actual concentration is dependent upon the overall characteristics of the solution including concentration and pH.

The solutions of alkaline-earth metal polysulfides and redox buffering agent form a solution with a pH of 7 to 9 when combined. On exposure to combustion gases once the pH of solution drops to pH 4.5 to 6.5 the components of the reagent begin to co-precipitate out and form the reactive agent as an active solid. It is therefore preferable that the active reagent has the maximum possible available active surface area and potential for favorable surface reaction with any available mercury compounds.

It will be appreciated that, in addition to mercury, other heavy metals present in a combustion gasses, can be recoverable through the practice of the present invention. Most heavy metals form stable metal sulfide precipitates. Some heavy metals should be stabilized against subsequent oxidation and resolubilization as a consequence of exposure to phosphates or similar redox buffering agents present in the remediation agent. Lead, selenium and other heavy metals can then be recovered in a water-stable form.

The present invention thus addresses the problem of reagent stability and milling costs whilst still retaining process residue stability such that the problem of mercury, and indeed, other heavy metals, in combustion gases arising from a coal fired power plants, furnaces or incinerators by providing an improved process for removing such pollutants, using readily obtainable reagents, techniques, and apparatuses, and which can be used with or in conventional combustion gas scrubbers, for example, flue gas desulfurization (FGD) scrubbers. The invention entails the use of the compositions disclosed herein alone or preferably, but not essentially, in combination with a conventional alkaline-earth metal carbonate FGD system.

The preferred polysulfide, calcium polysulfide ($CaS_x$), is available commercially as a 25-29% w/w solution. As it is a liquid, it is expected to offer numerous advantages over the prior art use of solid calcium sulfide. It is advantageous to utilize a solids free solution of this material, but on dilution in acidic environments below a pH of 7, 25-29% w/w calcium polysulfide solution, on loss of its beneficial self-solubilizing properties, will precipitate out as an emulsion of calcium polysulfide or sulfur lime. This sulfur lime then proceeds to rapidly flocculate, agglomerate and settle, thereby greatly reducing its available active surface area and its potential for favorable surface reaction with any available mercury compounds. Additionally, alkaline-earth phosphates such as calcium phosphates are insoluble at pH 4.5 and above. However, when acidic phosphates such as calcium dihydrogen phosphate are neutralized by excess calcium polysulfide, owing to the surfactant nature of the alkali liquid polysulfide and its interfering effect on crystallization, the resultant di-basic calcium hydrogen phosphate momentarily forms a super saturated solution typically taking up to a minute to precipitate out. This can be used to design the spray system so that the solution is used before such precipitation for optimum removal of the metal contaminants.

Another embodiment of the invention relates to a method of reducing metal or other contaminants or pollutants in combustion gasses. The method comprises providing a separate solution of at least one soluble alkaline-earth metal polysulfide and a separate solution of at least one soluble mono-basic alkaline-earth phosphoric acid salt, combining the two solutions during spraying of the separate solutions into a flue gas desulphurization scrubber or combining the solutions just prior to spraying the mixed solution into a flue gas desulphurization scrubber, and spraying the solution into either a wet or dry flue gas desulphurization scrubber so that the droplets of the spray that contains the reactive agent can contact the pollutants in the flue gas.

When the two solutions are introduced to the scrubber as separate sprays, the solutions should be injected into a region of the scrubber where they can mix intimately. This can be achieved by arranging spray nozzles such that the sprayed streams intersect and mix in situ.

The invention also relates to a use of a solution comprising at least one soluble alkaline-earth metal polysulfide and at least one soluble mono-basic alkaline-earth phosphoric acid salt for removing pollutants from combustion exhaust gasses. The use comprises combining separate solutions of the soluble alkaline-earth metal polysulfide and soluble mono-basic alkaline-earth phosphoric acid salt, and spraying the combined solution into a stream of exhaust gas to absorb metal(s) or other pollutants through contact of the gasses with the spray droplets and agglomerated solids formed by the co-precipitation of alkaline-earth metal polysulfide and mono-basic alkaline-earth phosphoric acid salt in the mixed solution.

The two solutions may be combined prior to injection into the FGD scrubber by mixing the solution streams externally in a manifold that feeds the injection nozzles. The manifold may consist of a simple "T" joint joining the two solution streams immediately before entry to the scrubber. The mixed solutions should preferably enter the scrubber in under one minute to avoid the reactants precipitating out of solution before contacting the flue gasses. The preferred location of the junction is therefore within ten (10) meters of the scrubber, and the inside diameter of the piping delivering the solution should not exceed 0.75 inches or 2 cm.

The mixed solution becomes aerosolized upon injection into a scrubber. The formation of small droplets of the reactive agent greatly increases the surface area available for contact with the flue gasses and mercury vapor. The mercury and other metals can react with the agent on the surface of the droplets or pass into the droplet to react therein with the alkaline-earth metal polysulfide and redox buffer agent to form the stable mercury sulfide. The presence of the hyperdispersant increases the amount of metallic mercury that passes into the interior of the droplets to react with the reagents. It also helps disperse the reactive agent in the solution before the droplets are formed by spraying the solution into the conduit.

In another embodiment, the reagents are not mixed together in the open prior to addition to the closed FGD system. Preferably, they are together mixed within a secure manifold and appropriate safety systems are installed such that the reagents or any spillages are not permitted to mix in the open or at any point prior to injection into the FGD or enclosed mixing manifold.

Under optimum conditions, the methods described herein are sufficient to suppress the $Hg^0$ re-emission phenomenon through the ability of the reagent to sequester iron and its oxides. Additionally, the $Hg^x$ capture rate within the FGD is raised from approximately 95% to >99% and the $Hg^0$ discharges from the stack are reducible by >40% of the levels inbound to the wet FGD. Thus, overall total mercury discharges can be reduced to the 0.5-1.5 $\mu g/Nm^3$ range thereby enabling full compliance with the EPA's Clean Air Interstate Rule.

The invention is adaptable to a wide range of processing or pollution control equipment. While it is possible to simply introduce the fine droplets of liquid composition into an exhaust or flue gas conduit by spraying or injection, it is also possible to introduce the composition into a conventional scrubber. Scrubbers for air pollution control are well known. Non-limiting examples of such scrubbers are the wet flue gas desulfurization (FGD) scrubber systems sold by Babcock and Wilcox (a subsidiary of McDermott International), and Alstrom Corp. These scrubbers have at least one spray level for introducing reagents, and include one or more spray nozzles.

It will also be appreciated that the removal of mercury and other metals from a combustion gas according to the invention is compatible with existing air pollution control equipment and methods for removing $SO_x$ and $NO_x$ gases from combustion gas. Additionally the process does not interfere with the chemistry of the formation of gypsum, $CaSO_4.2H_2O$, within the wet FGD and the gypsum produced is in no way render unsaleable by alteration in its chemical properties, physical appearance or odor.

Within a wet FGD scrubber, the oxygen transfer process is critical to the conversion of calcium sulfite, $CaSO_3$, to calcium sulfate, $CaSO_4.2H_2O$, (gypsum), which is saleable. The conversion of the by-product follows the equation; $CaSO_3 + \frac{1}{2}O_2 + 2H_2O = CaSO_4.2H_2O$. Any interference with this process leads to the binding of the calcium carbonate, $CaCO_3$ within the scrubber, a reduction in $SO_2$ removal capacity and a consequential deterioration in the quality of the gypsum by-product. In the worst cases, once saleable gypsum by-product is converted to complex calcium sulfite-sulfate hydrates, which are physically difficult to handle and a non-saleable gelatinous waste that must be disposed of by costly landfill. Importantly, the oxygen scavenging by metal sulfides can be a source of interference in the gypsum formation process. Critically, calcium polysulfide is less susceptible to oxidation and thus less able to adversely interference with the gypsum formation process than either calcium sulfide or sodium tetrasulfide.

In contrast, the incorporation of alkali metals salts such as sodium to the scrubber will result in a build-up of soluble alkali metal sulfates and halides, e.g., sodium sulfate and sodium chloride within the scrubber liquor. These agents will become concentrated on recycling of the scrubber liquor. Consequently, the gypsum isolated from a wet FGD process that incorporates addition of an alkali metal based reagent will be contaminated with the soluble alkali metal sulfates and halide salts thereby impairing the use and saleability of the gypsum as a material for wallboard manufacture or agricultural use. Thus, the sole use of alkaline-earth metal reagents is of further importance to the improved performance provided by the present invention.

Alternatively, the two solutions can be injected independently into the scrubber using feed systems. The solutions then combine when the droplets of the different solutions contact each other and coalesce. This reduces the amount of time the reactants have to precipitate or agglomerate before reacting with the mercury and other metals present in the flue gasses, however it also increases the cost and complexity of the delivery system due to the need of two separate feed systems for the solutions.

The phosphate component can be added in a variety of ways. In addition to spraying or injecting it as a separate stream, it may be added to the holding tank that supplies $SO_2$ absorbing slurry to the FGD.

Typically, the combination of solutions has a pH of 4.5 to 6.5 after mixing. This causes a precipitate of the active solid to form. It is not practical to attempt to increase the pH above 6.5 or below 4.5. The pH within the sump pump and recirculation tank of the scrubber may be within the range of 5.5 to 6.5, during the solution's residence time of approximately 10 minutes.

The solutions may be injected into either a dry or wet scrubber. When used with a wet scrubber the solution is typically injected through spray nozzles. Dry scrubbers typically use rotary atomizers to inject and disperse the solutions.

According to a particular embodiment of the invention, the method comprises pumping Reagent (A) a solution of 29% calcium polysulfide ($CaS_x$) (available commercially as BSP Cascade® from Best Sulfur Products of Fresno, Calif.) at pH 11.3 to 11.5 via a 0.75 inch pressure line through a positive displacement metering pump into the scrubber through a valve situated on the vacuum side of the scrubber liquor recirculation pump. Simultaneously Reagent (B) a solution of 2% w/w calcium dihydrogen phosphate at an approximate pH 3-3.5 is pumped via a second valve also located on the vacuum side of the recirculation pump, but located upstream of the calcium polysulfide addition valve. Ideally, the addition port for Reagent (B) is located several feet distance from that of Reagent (A) such that the possibility of the 2 reagents meeting in their concentrated state is minimized and the resulting mixture becoming fully incorporated within the FGD at pH 4.5 to 6.5. Alternatively the phosphate component of Reagent (B) in the form of any mono, di or tribasic alkaline-earth phosphate salt or phosphoric acid may into added to the holding tank that supplies $SO_x$ absorbing slurry to the FGD. Additionally Reagent (B) may contain a polymeric hyperdispersant or surfactant hyperdispersant to facilitate reagent dispersion and aid elemental mercury transfer to the liquid phase.

The alkaline-earth metal polysulfide solution and redox buffering agent solution are preferably pumped into the FGD scrubber system at a ratio of 1:1 by weight, and at a rate of 2,200 lbs (1,000 Kg) per hour for each solution, per 20 million standard cubic feet (scf) of flue gas entering the FGD system, (where 'scf' refers to gas volumes at 15.5° C./60° F. and 1.000 bar. 1.0 scf equating to approximately $0.0265/NM^3$).

The invention has been described in terms of various exemplary and preferred embodiments, but is not limited thereto. Various modifications can be made without departing from the invention, the scope of which is limited only by the appended claims and their equivalents. Throughout the claims, use of "an" and other singular articles is not intended to proscribe the use of plural components. Thus, more than one alkaline-earth metal polysulfide, more than one alkaline-earth based monobasic phosphoric acid salt, and so forth, may be utilized.

What is claimed is:

1. A composition for removing one or more metals from exhaust gasses comprising an aqueous solution of a first component of at least one water-soluble alkaline-earth polysulfide and a second component of at least one redox buffering agent, the solution initially having a pH of 7 or more to avoid precipitation of the components, with the polysulfide and buffering agent co-precipitating at a solution pH of 6.5 or less to form an active solid agent having an available surface area and potential for favorable surface reaction with metal and mercury compounds, such that upon contact with an exhaust gas, the pH of the solution is reduced to co-precipitate the polysulfide and buffering agent to form the active solid agent in amount sufficient to react with the metal(s) in the exhaust gas for removal therefrom.

2. The composition of claim 1, wherein the alkaline-earth polysulfide has a pH of greater than 10 and is present in the solution at a concentration of 20 to 35% w/w.

3. The composition of claim 2, wherein the alkaline-earth polysulfide is either a magnesium or calcium polysulfide present in the solution in an amount of 25 to 29%.

4. The composition of claim 3, wherein the composition is a mixture of magnesium polysulfides and calcium polysulfides, wherein the polysulfides are present in the solution in an amount of 25 to 29%.

5. The composition of claim 1, wherein the redox buffering agent is a water-soluble monobasic alkaline earth metal salt of phosphoric acid.

6. The composition of claim 1, wherein the redox buffering agent has a pH of 3 to 3.5 and is present in the aqueous solution at a concentration of 0.5 to 5% w/w.

7. The composition of claim 3, wherein the redox buffering agent has a pH of 3 to 3.5 and is present in the aqueous solution at a concentration of 0.5 to 5% w/w, and the aqueous solution has a pH of between 7 and 9.

8. The composition of claim 1, wherein the composition further comprises a surfactant or hyperdispersant in an amount sufficient to assist in maintaining the reaction agent in the solution prior to reaction with the metal(s).

9. The composition of claim 8, wherein the surfactant or hyperdispersant is a polyethylene oxide-polyethylene block co-polymer and the phosphate esters thereof.

10. A method of removing metals from an exhaust gas which comprises contacting the exhaust gas with the composition of claim 1 so that the pH of the solution can be reduced to facilitate co-precipitation of the polysulfide and buffering agent and formation of the active agent in an amount sufficient to contact with and remove metal(s) from the exhaust gas.

11. The method of claim 10, which further comprises spraying the composition into a conduit that carries the exhaust gas such that the gas reduces the pH of the solution with the polysulfide and buffering agent co-precipitating at a pH of 4.5 to 6.5 to form the agent in droplets of the solution with the agent reacting with the metal(s) in the exhaust gas for removal therefrom.

12. The method of claim 11, wherein the composition is introduced into the conduit by adding it to a conventional flue gas desulfurization solution that is sprayed into the conduit.

13. The method of claim 11, which further comprises:
   providing a first solution of the at least one water-soluble alkaline-earth metal polysulfide;
   providing a second solution of the at least one redox buffering agent;
   combining the solutions together to form the composition just prior to spraying it to form the agent that reacts with the metal(s) in the exhaust gas.

14. The method of claim 13, wherein the solutions are combined less than one minute before being sprayed into the exhaust gas conduit.

15. The method of claim 10, which further comprises:
   providing a first solution of the at least one water-soluble alkaline-earth metal polysulfide;
   providing a second solution of the at least one redox buffering agent;
separately spraying or injecting each solution into the conduit in a manner such that they intersect, combine, interact or coalesce in the conduit to form the composition in situ and such that the gas reduces the pH of the solution with the polysulfide and buffering agent co-precipitating at a pH of 4.5 to 6.5 to form the agent in droplets of the solution with the agent reacting with the metal(s) in the exhaust gas for removal therefrom.

16. The composition of claim 1 wherein the solution initially has a pH of between 7 and 9 and after contact with the exhaust gas the pH is reduced to between 4.5 and 6.5 to facilitate co-precipitation of the polysulfide and buffering agent to form the solid active agent.

17. The method of claim 10 wherein the solution initially has a pH of between 7 and 9 and after contact with the exhaust gas the pH is reduced to between 4.5 and 6.5 to facilitate co-precipitation of the polysulfide and buffering agent to form the solid active agent.

18. The composition of claim 16 wherein the metal(s) to be removed from the exhaust gas includes mercury.

19. The method of claim 17 wherein the metal(s) to be removed from the exhaust gas includes mercury.

* * * * *

UNITED STATES PATENT AND TRADEMARK OFFICE
CERTIFICATE OF CORRECTION

PATENT NO. : 7,776,294 B2  Page 1 of 1
APPLICATION NO. : 12/362049
DATED : August 17, 2010
INVENTOR(S) : Hurley It is certified that error appears in the above-identified patent and that said Letters Patent is hereby corrected as shown below:

Column 10:
Line 55 (claim 1, line 13), before "amount" insert -- an --.

Column 11:
Line 16 (claim 9, line 2), change "oxide-polyethylene" to -- oxide - polyethylene --.

Signed and Sealed this

Twelfth Day of October, 2010

David J. Kappos
*Director of the United States Patent and Trademark Office*